United States Patent
Romm et al.

(10) Patent No.: US 10,484,714 B2
(45) Date of Patent: Nov. 19, 2019

(54) CODEC FOR MULTI-CAMERA COMPRESSION

(71) Applicant: Intel Corporation, Santa Clara, CA (US)

(72) Inventors: Ilya Romm, Bat-Yam (IL); Eyal Ruhm, Tel Aviv (IL); Maxym Dmytrychenko, Munich (DE)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 15/716,627

(22) Filed: Sep. 27, 2017

(65) Prior Publication Data

US 2019/0098337 A1 Mar. 28, 2019

(51) Int. Cl.
*H04N 19/36* (2014.01)
*H04N 19/597* (2014.01)
*H04N 19/105* (2014.01)
*H04N 19/33* (2014.01)

(52) U.S. Cl.
CPC ......... *H04N 19/597* (2014.11); *H04N 19/105* (2014.11); *H04N 19/33* (2014.11); *H04N 19/36* (2014.11)

(58) Field of Classification Search
CPC .... H04N 19/597; H04N 19/33; H04N 19/105; H04N 19/36
USPC .................................................. 375/240.12
See application file for complete search history.

(56) References Cited

U.S. PATENT DOCUMENTS

| | | | | |
|---|---|---|---|---|
| 6,421,754 B1* | 7/2002 | Kau | ..................... | G06F 13/24 710/261 |
| 7,411,983 B2* | 8/2008 | Jo | ..................... | H04J 3/0608 370/503 |
| 2004/0179591 A1* | 9/2004 | Wenger | ............... | H04N 7/152 375/240.01 |
| 2004/0228413 A1* | 11/2004 | Hannuksela | ....... | H04N 21/6437 375/240.25 |
| 2005/0169371 A1* | 8/2005 | Lee | ..................... | H04N 19/105 375/240.03 |
| 2011/0216834 A1* | 9/2011 | Zhou | ..................... | H04N 7/12 375/240.24 |
| 2012/0089410 A1* | 4/2012 | Mikurak | ............... | G06Q 10/00 705/1.1 |
| 2012/0185905 A1* | 7/2012 | Kelley | ................... | H04N 9/75 725/109 |
| 2013/0034151 A1* | 2/2013 | Zhou | ..................... | H04N 19/42 375/240.03 |

(Continued)

OTHER PUBLICATIONS

Ku et al, A high definition H.264/AVC intra-frame codec IP for digital video and still camera applications (Year: 2006).*

(Continued)

*Primary Examiner* — Shan E Elahi
(74) *Attorney, Agent, or Firm* — Green, Howard & Mughal LLP.

(57) ABSTRACT

An embodiment of a semiconductor package apparatus may include technology to process a single stream of video frames which includes frame information from two or more video sources, and process a current frame based on information from a prior frame in the single stream of video frames which precedes the current frame by a number of frames based on a number of video sources represented in the single stream of video frames. Other embodiments are disclosed and claimed.

24 Claims, 7 Drawing Sheets

(56) References Cited

U.S. PATENT DOCUMENTS

| | | | | |
|---|---|---|---|---|
| 2013/0173819 A1* | 7/2013 | Lee | ............ | H04N 21/23418 |
| | | | | 709/231 |
| 2014/0044193 A1* | 2/2014 | Dikbas | ............ | H04N 19/147 |
| | | | | 375/240.19 |
| 2015/0135214 A1* | 5/2015 | Reisman | ......... | H04N 21/64322 |
| | | | | 725/37 |

OTHER PUBLICATIONS

Ju et al, A 0.5nJ/pixel 4K H.265/HEVC Codec LSI for multi-frame smartphone applications (Year: 2016).*

Wikipedia, "Multiview Video Coding", Wikipedia: the free encyclopedia, retrieved Sep. 6, 2017, 4 pages.

* cited by examiner

|  | C1 | C2 | ... | C7 | C8 | C9 | ... | C14 | C15 | C16 | ... | C21 |
|---|---|---|---|---|---|---|---|---|---|---|---|---|
| F1 | IDR 1 | IDR 2 | ... | IDR 7 | IDR 8 | IDR 9 | ... | IDR 14 | IDR 15 | IDR 16 | ... | IDR 21 |
| F2 | P 22 | P 23 | ... | P 28 | P 29 | P 30 | ... | P 35 | P 36 | P 37 | ... | P 42 |
| ... | ... | ... | ... | ... | ... | ... | ... | ... | ... | ... | ... | ... |
| F30 | P 610 | P 611 | ... | P 616 | P 617 | P 618 | ... | P 622 | P 623 | P 624 | ... | P 630 |
| F31 | IDR 631 | IDR 632 | ... | IDR 637 | IDR 638 | IDR 639 | ... | IDR 644 | IDR 645 | IDR 646 | ... | IDR 651 |
| F32 | P 652 | P 653 | ... | P 658 | P 659 | P 660 | ... | P 665 | P 666 | P 667 | ... | P 672 |

FIG. 9

CODEC FOR MULTI-CAMERA COMPRESSION

TECHNICAL FIELD

Embodiments generally relate to video processing. More particularly, embodiments relate to a codec for multi-camera compression.

BACKGROUND

A video image may be constructed from a number of frames or pictures. Various compression techniques may be used to reduce the size of the video image. Various encode/decode techniques may be used to encode/decode a stream of video images.

BRIEF DESCRIPTION OF THE DRAWINGS

The various advantages of the embodiments will become apparent to one skilled in the art by reading the following specification and appended claims, and by referencing the following drawings, in which:

FIG. 9 is an illustrative diagram of an example of a video stream layout according to an embodiment;

DESCRIPTION OF EMBODIMENTS

Figure 1:
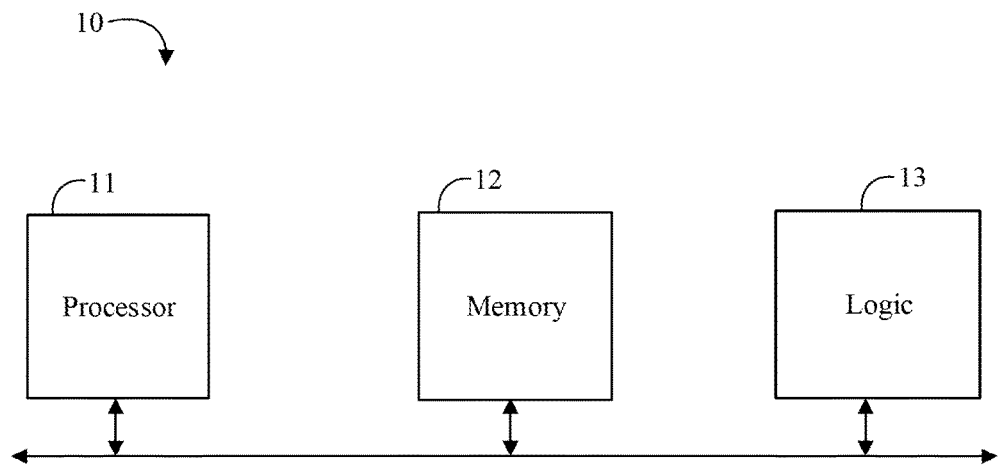
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to process a single stream of video frames which includes frame information from two or more video sources, and process a current frame based on information from a prior frame in the single stream of video frames which precedes the current frame by a number of frames based on a number of video sources represented in the single stream of video frames. In some embodiments, the logic 13 may be further configured to process each sequential frame in the single stream of video frames as originated from a different one of the two or more video sources. For example, the logic 13 may be configured to determine a frame position of the prior frame based on a frame position of the current frame minus the number of video sources represented in the single stream of video frames. The logic 13 may be further configured to determine a video source position of a frame based on a frame position of the frame modulo the number of video sources represented in the single stream of video frames. In some embodiments, the logic 13 may be configured to encode the single stream of video frames, and/or to decode the single stream of video frames.

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, processing a single stream of video frames which includes frame information from two or more video sources, processing a current frame based on information from a prior frame in the single stream of video frames which precedes the current frame by a number of frames based on a number of video sources represented in the single stream of video frames, etc.).

Figure 2:
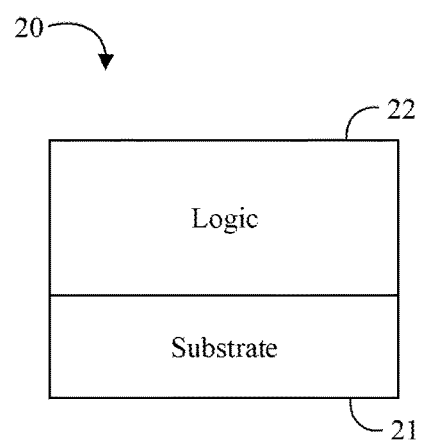
FIG. 2 is a block diagram of an example of a semiconductor package apparatus according to an embodiment.

Turning now to FIG. 2, an embodiment of a semiconductor package apparatus 20 may include a substrate 21, and logic 22 coupled to the substrate 21, wherein the logic 22 is at least partly implemented in one or more of configurable logic and fixed-functionality hardware logic. The logic 22 coupled to the substrate 21 may be configured to process a single stream of video frames which includes frame information from two or more video sources, and process a current frame based on information from a prior frame in the single stream of video frames which precedes the current frame by a number of frames based on a number of video sources represented in the single stream of video frames. In some embodiments, the logic 22 may be further configured to process each sequential frame in the single stream of video frames as originated from a different one of the two or more video sources. For example, the logic 22 may be configured to determine a frame position of the prior frame based on a frame position of the current frame minus the number of video sources represented in the single stream of video frames. The logic 22 may be further configured to determine a video source position of a frame based on a frame position of the frame modulo the number of video sources represented in the single stream of video frames. In some embodiments, the logic 22 may be configured to encode the single stream of video frames, and/or to decode the single stream of video frames.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 3A:
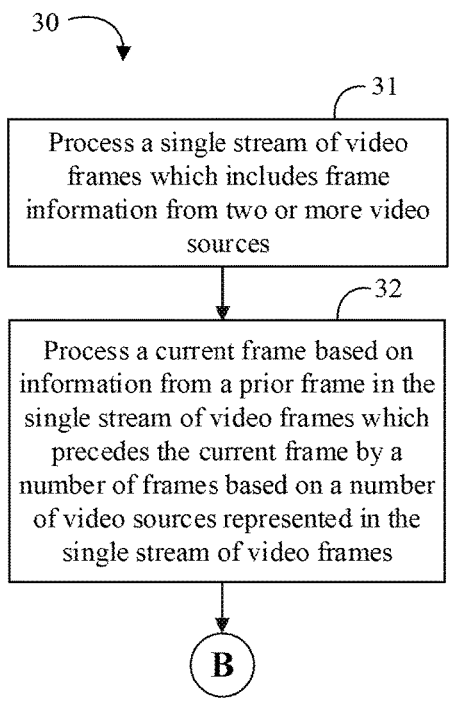
FIGS. 3A to 3B are flowcharts of an example of a method of processing a video stream according to an embodiment.
Figure 3B:
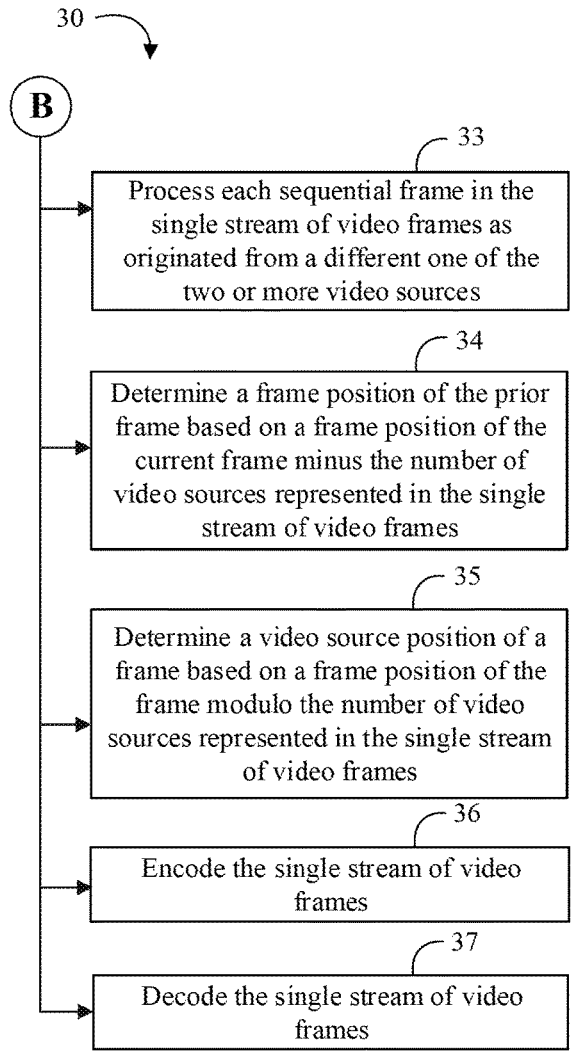

Turning now to FIG. 3, an embodiment of a method 30 of processing a video stream may include processing a single stream of video frames which includes frame information from two or more video sources at block 31, and processing a current frame based on information from a prior frame in the single stream of video frames which precedes the current frame by a number of frames based on a number of video sources represented in the single stream of video frames at block 32. Some embodiments of the method 30 may further include processing each sequential frame in the single stream of video frames as originated from a different one of the two or more video sources at block 33. The method 30 may also include determining a frame position of the prior frame based on a frame position of the current frame minus the number of video sources represented in the single stream of video frames at block 34. For example, the method 30 may include determining a video source position of a frame based on a frame position of the frame modulo the number of video sources represented in the single stream of video frames at block 35. Some embodiments of the method 30 may further include encoding the single stream of video frames at block 36, and/or decoding the single stream of video frames at block 37.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in firmware, applications (e.g., through an application programming interface (API)), or driver software running on an operating system (OS).

Figure 4:
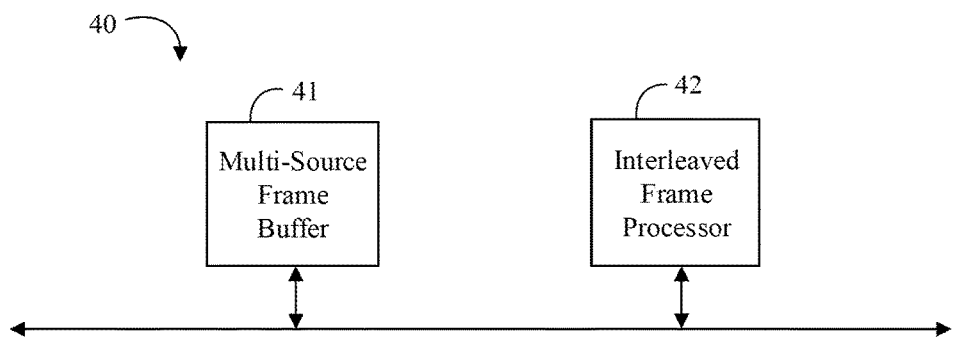
FIG. 4 is a block diagram of an example of a multi-source frame processor apparatus according to an embodiment.

Turning now to FIG. 4, an embodiment of a multi-source frame processor 40 may include a multi-source frame buffer 41, and an interleaved frame processor 42. For example, the multi-source frame buffer 41 may store frames from a single stream of video frames which includes frame information from two or more video sources. The interleaved frame processor 42 may process a current frame based on information from a prior frame in the single stream of video frames which precedes the current frame by a number of frames based on a number of video sources represented in the single stream of video frames. In some embodiments, the interleaved frame processor 42 may be further configured to process each sequential frame in the single stream of video frames as originated from a different one of the two or more video sources. For example, the interleaved frame processor 42 may be configured to determine a frame position of the prior frame based on a frame position of the current frame minus the number of video sources represented in the single stream of video frames. The interleaved frame processor 42 may be further configured to determine a video source position of a frame based on a frame position of the frame modulo the number of video sources represented in the single stream of video frames. In some embodiments, the interleaved frame processor 42 may be configured to encode the single stream of video frames, and/or to decode the single stream of video frames.

Without being limited to specific implementations, some embodiments may encode/decode a video stream using one or more of an intra-coded picture (I-frame), a predicted picture (P-frame), and/or a bi-directional predicted picture (B-frame). An I-frame may include a complete picture and may not need any other frames to encode/decode. A P-frame may include changes in the image from a prior frame and may be more compressible than an I-frame. A P-frame may sometimes also be referred to as a delta frame. A B☐frame may include differences between the current frame and both a prior frame and a subsequent frame, and may be more compressible than an I-frame and/or a P-frame.

In some embodiments, frame information may include picture information or picture-related information. For example, a frame may refer to a complete image while a picture may refer to a frame or field. In some embodiments, frame information may include a field or field-related information. A field may refer to a set of odd-numbered or even-numbered scan lines composing a partial image. When video is sent in interlaced-scan format, each frame may be sent in two fields. Namely, the field of odd-numbered lines and the field of even-numbered lines. In some embodiments, frame information may also include slices or macroblocks. A frame or picture may be segmented into macroblocks, and individual prediction types can be selected on a macroblock basis rather than being the same for the entire frame/picture. A slice may refer to a spatially distinct region of a frame that is encoded separately from any other region in the same frame (e.g., I-slices, P-slices, and B-slices may take the place of I-frames, P-frames, and B frames). Video standards such as the MOTION PICTURE EXPERTS GROUP (MPEG) standards may include I-frames, P-frames, B-frames, fields, macroblocks, slices, I-slices, P-slices, and/or B-slices. Such MPEG standards may include, for example, MPEG-4 ADVANCED VIDEO CODING (AVC), also referred to as H.264, and HIGH EFFICIENCY VIDEO CODING (HEVC), also referred to H.265.

In some other systems, a P-frame may always be decoded using the immediately previous frame, and a B-frame may always be decoded using the immediately previous frame and the immediately next frame. In some other multi-source video systems, separate video streams may be used with one video stream per video source. For other multi-source video systems, synchronization of the multiple sources may cause a problem. For example, different sources may use different formats, multiple decoders may be needed to decode each stream, and/or the amount of time to decode the multiple separate video streams may be different. Advantageously, some embodiments may interleave the frames from multiple video sources into a single video stream to reduce or eliminate the need for synchronization and improve performance. Some embodiments may also advantageously reduce or eliminate the need for multiple decoders.

A reference frame may refer to a frame on which a prediction frame may be based. Some embodiments may determine the prior reference frame for a current P-frame/B-frame based on the current frame position minus the number of video sources. Some embodiments may determine the subsequent reference frame for a current B-frame based on the current frame position plus the number of video sources. Some embodiments may use multiple reference frames (e.g., H.264 permits up to 15). For an embodiment with five (5) video sources, for example, for frame position 6 one reference frame may include frame position 1, for frame position 11 two reference frames may include frame positions 1 and 6, for frame 16 three reference frames may include frame positions 1, 6, and 11, and so on.

Some embodiments may determine a position of the video source for a frame based on the frame position modulo the number of video sources. For example, the modulo operation may result in the remainder after division of one number by another (e.g., which may also be referred to as the modulus). For an embodiment with five (5) video sources, for example, the first five frames (frames 1 through 5) of the video stream may be respectively occupied by the information related to the first frame of each video source, the next five frames (frames 6 through 10) of the video stream may be respectively occupied by information related to the second frame of each video source, and so on. For video source material having a group of picture (GOP) size of thirty (30) frames, the single video stream will include 150 frames in the video stream between intra frames, with the first five frames of the stream corresponding to the intra frames and the remaining 145 frames corresponding to prediction frames.

For the current example, frame position 6 minus 5 (e.g., the number of video sources) results in frame position 1 for the prior reference frame for frame position 6. Likewise, frame position 11 minus 5 results in frame position 6 for the prior reference frame for frame position 11, and so on. The subsequent reference frame may be determined by adding the number of video sources to the current frame position. For the current example, frame position 6 plus 5 results in frame position 11 for the subsequent reference frame for frame position 6. Likewise, frame position 11 plus 5 results in frame position 16 for the subsequent reference frame for frame position 11. For the current example, frame position 7 minus 5 (e.g., the number of video sources) results in frame position 2 for the prior reference frame for frame position 7. Likewise, frame positions 12 minus 5 results in frame position 7 for the prior reference frame for frame position 12, and so on. For the current example, frame position 7 plus 5 results in frame position 12 for the subsequent reference frame for frame position 7. Likewise, frame position 12 plus 5 results in frame position 17 for the subsequent reference frame for frame position 12, and so on.

For the current example, frame position 6 modulo 5 (e.g., the number of video sources) results in video source 1 for the video source position. Likewise, frame positions 11, 16, 21, 26, and so on modulo 5 results in video source 1 for the video source position for those frame positions. For the current example, frame position 7 modulo 5 (e.g., the number of video sources) results in video source 2 for the video source position. Likewise, frame positions 12, 17, 22, 27, and so on modulo 5 results in video source 2 for the video source position for those frame positions. The video source position for frames corresponding to multiples of the number of video sources may be mapped to position 0 (e.g., because 15 modulo 5=0), a function may map a modulo result of 0 to the video source position corresponding to the number of video sources (e.g., video_source_position [modulo=0]=N), or other suitable techniques may be applied to handle when the result of the modulo operation is zero (0). Alternatively, some embodiments may represent the video sources as starting at video source position zero (0) and continuing through video source position N−1.

In some embodiments, a programmable counter may be utilized to determine the video source positions and/or appropriate reference frames. For example, a counter may be programmed to count from 1 to the number of video sources and then restart at 1 to determine the video source position, with the counter incremented every time a frame is processed. The GOP size times the number of video sources may be added to the counter value to determine the subsequent intra frame position. Alternatively, another counter may be programmed to count from the GOP size times the number of video sources to that amount plus the number of video sources and then restart at the GOP size times the number of video sources to determine the subsequent intra frame position, with the counter incremented every time a frame is processed. In some embodiments, the counter value(s) may be added to a frame buffer memory address which points to the start of the current set of frames being processed. Given the benefit of the present disclosure, however, numerous other arrangements for interleaving the frames from multiple videos sources with suitable techniques to identify the appropriate reference frames may occur to those skilled in the art.

In some embodiments, the first set of frames in a video stream may correspond to I-frames or instantaneous decoder refresh (IDR)-frames. For the above example, the predicted frames may be determined based on the most recent IDR frame such that the changes from non-IDR-frame to non-IDR-frame are not cumulative and the modulo operation returns the appropriate reference IDR-frame for a current non-IDR-frame. In some embodiments, the changes from non-IDR-frame to non-IDR-frame may be cumulative. For example, the multi-source frame buffer 41 may hold a complete frame for each video source in frame buffer positions 1 through N, where N corresponds to the number of video sources. The frame data at each position may be replaced when an IDR-frame is processed and may be updated when each non-IDR-frame is processed. Accordingly, either the counter or the modulo operation will point to the frame buffer position which holds the appropriate reference frame information.

Some embodiments may group sets of frame together (e.g., two frames from each camera, four frames from each camera, etc.) in the interleaved layout, such that only the boundary frames in each set may use the calculation based on the number of video sources to determine the appropriate reference frame(s). For example, encoding/decoding for a set of four P-frames from the same video source may need to determine the position of the appropriate reference frame for frame position 1 only, while frames 2 through 4 in that set may use the immediately prior frame. For example, encoding/decoding for a set of four B-frames from the same video source may need to determine the position of the appropriate reference frames for frame positions 1 and 4 only, while frames 2 and 3 in that set may use the immediately prior and subsequent frames.

Embodiments of the multi-source frame buffer 41, the interleaved frame processor 42, and other components of the multi-source frame processor 40, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Some embodiments may advantageously provide multi-camera compression using a frame layout inside a single video stream. For example, the multiple video sources may be provided from two or more cameras. Views from several cameras may advantageously be arranged in an interleaved layout in one stream. For example, the stream may be encoded and decoded with a H.264/H.265 based coder/decoder (codec), configured to process the multiple-source format in accordance with some embodiments. Advantageously, some embodiments may use one decoder for several cameras, which may reduce or eliminate the need for synchronization between multiple video sources and may also improve performance.

Figure 5:
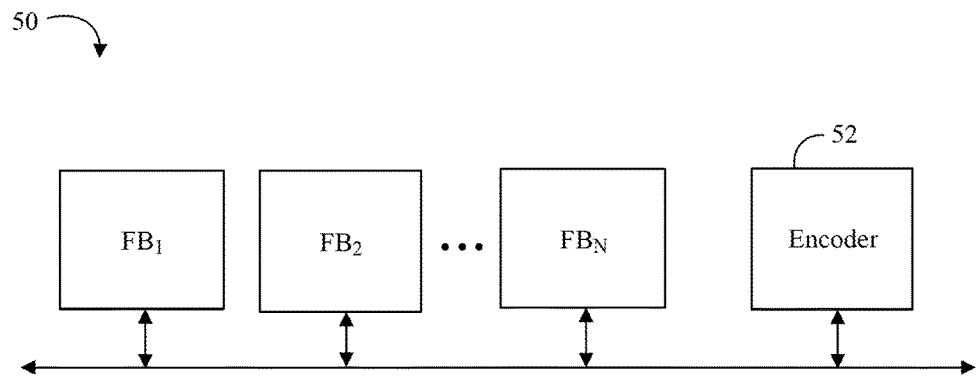
FIG. 5 is a block diagram of an example of a multi-camera encoder according to an embodiment.

Turning now to FIG. 5, an embodiment of a multi-camera encoder 50 may include multiple frame buffers $FB_1$ through $FB_N$ (N>1) communicatively coupled to an encoder 52. For example, the frame buffers $FB_1$ through $FB_N$ may each store frames from a different camera source. The encoder 52 may encode the information from the multiple frame buffers $FB_1$ through $FB_N$ into a single stream of video frames which includes the frame information from the N cameras. The encoder 52 may be configured to encode a current frame based on information from a prior frame in the single stream of video frames which precedes the current frame by a number of frames based on the number N. In some embodiments, the encoder 52 may be configured to encode each sequential frame in the single stream of video frames as originated from a different one of the N cameras. For example, the encoder 52 may be configured to determine a frame position of the prior frame based on a frame position of the current frame minus the number N. The encoder 52 may be further configured to determine a video source position of a frame based on a frame position of the frame modulo the number N. In some embodiments, the encoder 52 may be configured to encode the single stream of video frames using compression techniques compatible with a MPEG standard format such H.264 or H.265, but each P-frame/B-frame may use the frame position corresponding the current frame minus the number N as the prior reference frame for the prediction (e.g., B-frames may use the number N in an additional calculation for the subsequent reference frame). Alternatively, some embodiments may group sets of frames together (e.g., two frames from each camera, four frames from each camera, etc.) in the interleaved layout, such that only the boundary frames in each set may use the number N to determine the appropriate reference frame(s).

Figure 6:
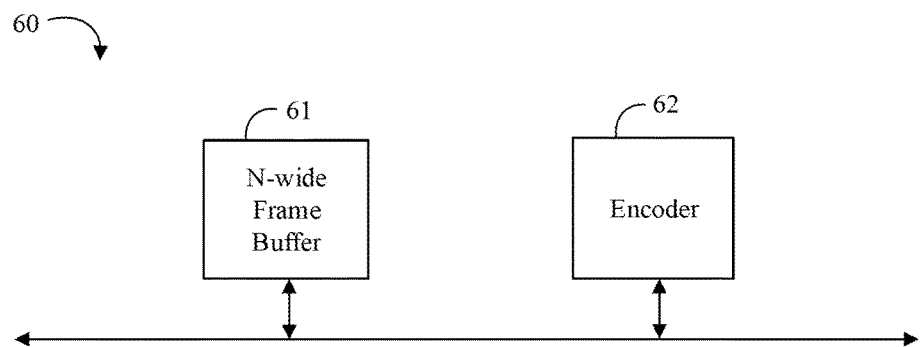
FIG. 6 is a block diagram of another example of a multi-camera encoder according to an embodiment.

Turning now to FIG. 6, an embodiment of a multi-camera encoder 60 may include an N-wide frame buffer 61 (N>1) communicatively coupled to an encoder 62. For example, the N-wide frame buffer 61 may each store frames from N camera sources. The encoder 62 may encode the information from the N-wide frame buffer 61 into a single stream of video frames which includes the frame information from the N cameras. The encoder 62 may be configured to encode a current frame based on information from a prior frame in the single stream of video frames which precedes the current frame by a number of frames based on the number N. In some embodiments, the encoder 62 may be configured to encode each sequential frame in the single stream of video frames as originated from a different one of the N cameras. For example, the encoder 62 may be configured to determine a frame position of the prior frame based on a frame position of the current frame minus the number N. The encoder 62 may be further configured to determine a video source position of a frame based on a frame position of the frame modulo the number N. In some embodiments, the encoder 62 may be configured to encode the single stream of video frames using compression techniques compatible with a MPEG standard format such H.264 or H.265, but each P-frame/B-frame may use the frame position corresponding the current frame minus the number N as the prior reference frame for the prediction (e.g., B-frames may use the number N in an additional calculation for the subsequent reference frame). Alternatively, some embodiments may group sets of frames together (e.g., two frames from each camera, four frames from each camera, etc.) in the interleaved layout, such that only the boundary frames in each set may use the number N-based calculation(s) to determine the appropriate reference frame(s).

Figure 7:
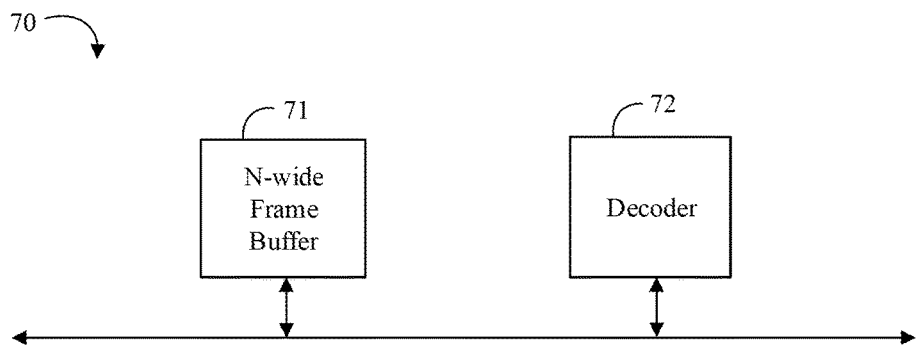
FIG. 7 is a block diagram of an example of a multi-camera decoder according to an embodiment.

Turning now to FIG. 7, an embodiment of a multi-camera decoder 70 may include an N-wide frame buffer 71 (N>1) communicatively coupled to a decoder 72. The decoder 72 may decode the information from a single stream of video which includes frame information from N cameras into the N-wide frame buffer 71. The decoder 72 may be configured to decode a current frame based on information from a prior frame in the single stream of video frames which precedes the current frame by a number of frames based on the number N. In some embodiments, the decoder 72 may be configured to decode each sequential frame in the single stream of video frames as originated from a different one of the N cameras. For example, the decoder 72 may be configured to determine a frame position of the prior frame based on a frame position of the current frame minus the number N. The decoder 72 may be further configured to determine a video source position of a frame based on a frame position of the frame modulo the number N. In some embodiments, the decoder 72 may be configured to encode the single stream of video frames using compression techniques compatible with a MPEG standard format such H.264 or H.265, but each P-frame/B-frame may use the frame position corresponding the current frame minus the number N as the reference frame for the prediction (e.g., B-frames may use the number N in an additional calculation for the subsequent reference frame). Alternatively, some embodiments may group sets of frames together (e.g., two frames from each camera, four frames from each camera, etc.) in the interleaved layout, such that only the boundary frames in each set may use the modulo calculation to determine the appropriate reference frame(s). In some embodiments, the decoder 72 may not need to decode information from all of the encoded video sources. For example, if N=5 and camera 1 and camera 4 are not needed for the output, the decoder 72 may skip all frames related to camera 1 and 4 (e.g., all frames with modulo 5 equal to 1 or 4). Some embodiments may save processing bandwidth and/or battery power by skipping unneeded frames in the single video stream.

Figure 8:
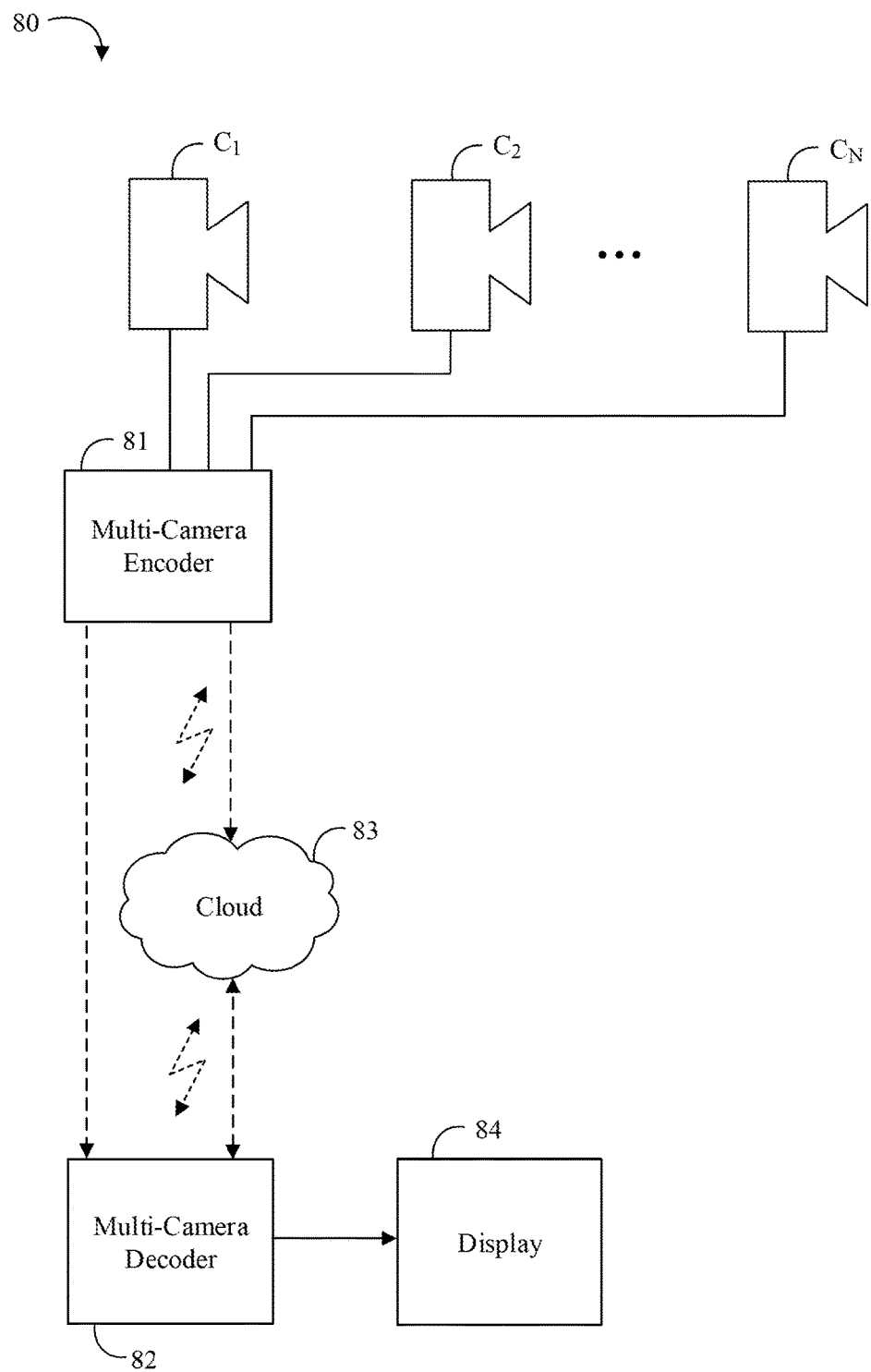
FIG. 8 is a block diagram of another example of an electronic processing system according to an embodiment.

Turning now to FIG. 8, an embodiment of an electronic processing system 80 may include two or more cameras $C_1$ through $C_N$ (N>1) communicatively coupled to a multi-camera encoder 81 (e.g., wired or wirelessly). The multi-camera encoder 81 may be communicatively coupled to a compatible multi-camera decoder 82 (e.g., wired or wirelessly and/or directly or indirectly). For example, the multi-camera 81 may upload a video stream to a cloud server or service 83 and the multi-camera decoder 82 may download the video stream from the cloud 83 (e.g., live streaming or as a video file). The multi-camera decoder 82 may decode the video stream for viewing on a display 84.

In some embodiments, the multi-camera encoder 81 may be configured to encode a single stream of video frames which includes frame information from the two or more cameras $C_1$ through $C_N$, and encode a current frame based on information from a prior frame in the single stream of video frames which precedes the current frame by a number of frames based on the number N. In some embodiments, the encoder 81 may be further configured to encode each sequential frame in the single stream of video frames as originated from a different one of the two or more cameras $C_1$ through $C_N$. For example, the encoder 81 may be configured to determine a frame position of the prior frame based on a frame position of the current frame minus the number N. The encoder 81 may be further configured to determine a video source position of a frame based on a frame position of the frame modulo the number N.

In some embodiments, the multi-camera decoder 82 may be configured to decode the single stream of video frames created by the encoder 81 which includes frame information from the two or more cameras $C_1$ through $C_N$, and decode a current frame based on information from a prior frame in the single stream of video frames which precedes the current frame by a number of frames based on the number N. In some embodiments, the decoder 82 may be further configured to decode each sequential frame in the single stream of video frames as originated from a different one of the two or more cameras $C_1$ through $C_N$. For example, the decoder 82 may be configured to determine a frame position of the prior frame based on a frame position of the current frame minus the number N. The decoder 82 may be further configured to determine a video source position of a frame based on a frame position of the frame modulo the number N. Advantageously, some embodiments may provide multi-camera compression and/or a multi-camera codec. Some embodiments may also work with a single camera (e.g., where N=1) so that the same codec may be used for both single camera and multi-camera encoding/decoding applications.

Turning now to FIG. 9, an embodiment of a video stream frame layout for twenty-one (21) cameras may be arranged as follows: all first frames of each camera, all second frames of all cameras and so on. For convenience, FIG. 9 includes frame labels F1 through F32 and camera labels C1 through C21. The interior boxes in FIG. 9 represent frame information where "IDR" indicates an IDR-frame and "P" indicates a P-frame. The number inside each interior box indicates a sequential frame position. For H.264/H.265 based encoding/decoding, for example, each non-IDR-frame may take the frame position minus the number of cameras as prediction (e.g., as opposed to the immediately previous frame). For an embodiment with 21 cameras, for example, at frame position 22 (frame F2, camera C1, F2C1), the codec will take frame 22−21=frame position 1 (frame F1, camera C1, F1C1) as the prediction frame (e.g., as opposed to frame position 21; F1C21). If a group of picture (GOP) size is 30, then all frames in frame positions 1-21 (F1C1-F1C21), 631-651 (F31C1-F31C21) and so on will be IDR frames. Some embodiments may advantageously provide a modified version of a H.264/H.265 codec, which utilizes frame position minus number of cameras as reference instead of utilizing the previous frame as a reference. Advantageously, some embodiments may use one decoder for several cameras, which may reduce or eliminate the need for synchronization between multiple video sources and may also improve performance.

Figure 10:
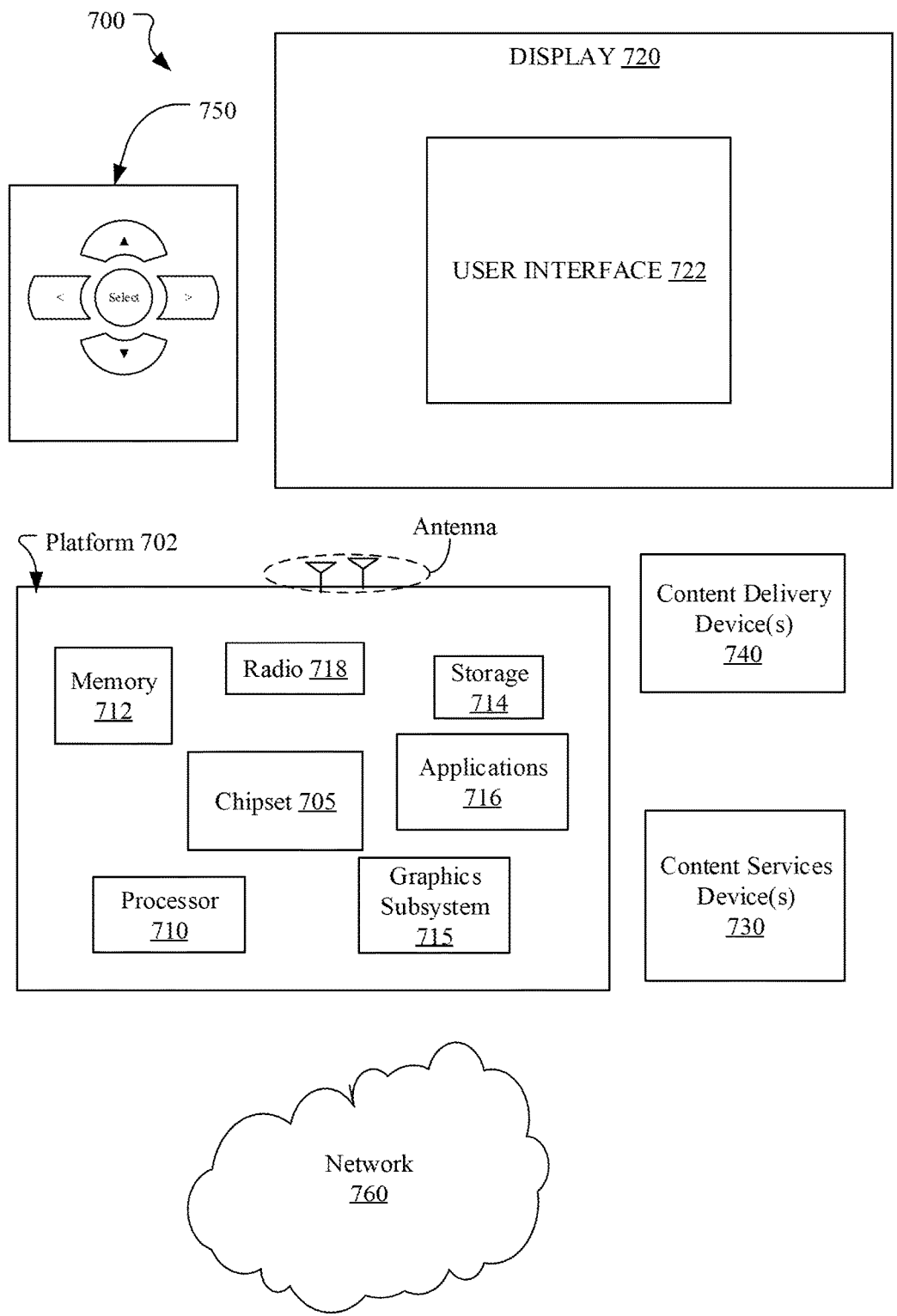
FIG. 10 is a block diagram of an example of a system having a navigation controller according to an embodiment.

FIG. 10 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface (HDMI), DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705. In one example, the graphics subsystem 715 includes a noise reduction subsystem as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
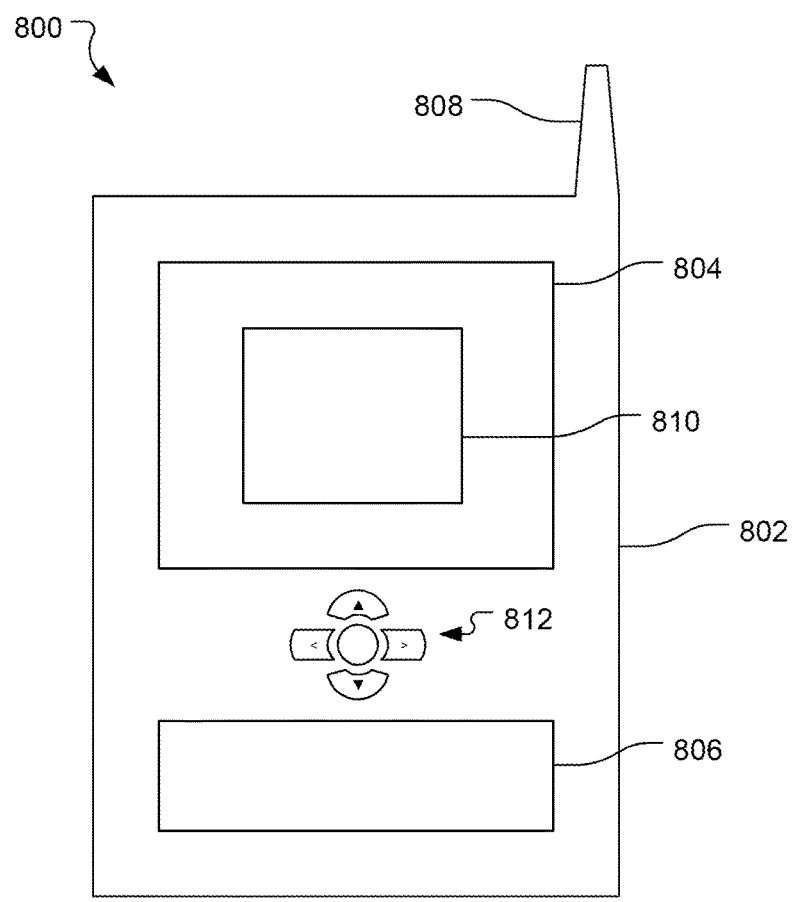
FIG. 11 is a block diagram of an example of a system having a small form factor according to an embodiment.

As described above, the system 700 may be embodied in varying physical styles or form factors. FIG. 11 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

The system 700 and/or the device 800 may configured to include and/or implement the various embodiments described herein, including but not limited to those described in the following Additional Notes and Examples.

ADDITIONAL NOTES AND EXAMPLES

Example 1 may include an electronic processing system, comprising a processor, memory communicatively coupled to the processor, and logic communicatively coupled to the processor to process a single stream of video frames which includes frame information from two or more video sources, and process a current frame based on information from a prior frame in the single stream of video frames which precedes the current frame by a number of frames based on a number of video sources represented in the single stream of video frames.

Example 2 may include the system of Example 1, wherein the logic is further to process each sequential frame in the single stream of video frames as originated from a different one of the two or more video sources.

Example 3 may include the system of Example 1, wherein the logic is further to determine a frame position of the prior frame based on a frame position of the current frame minus the number of video sources represented in the single stream of video frames.

Example 4 may include the system of Example 3, wherein the logic is further to determine a video source position of a frame based on a frame position of the frame modulo the number of video sources represented in the single stream of video frames.

Example 5 may include the system of any of Examples 1 to 4, wherein the logic is further to encode the single stream of video frames.

Example 6 may include the system of any of Examples 1 to 4, wherein the logic is further to decode the single stream of video frames.

Example 7 may include a semiconductor package apparatus, comprising a substrate, and logic coupled to the substrate, wherein the logic is at least partly implemented in one or more of configurable logic and fixed-functionality hardware logic, the logic coupled to the substrate to process a single stream of video frames which includes frame information from two or more video sources, and process a current frame based on information from a prior frame in the single stream of video frames which precedes the current frame by a number of frames based on a number of video sources represented in the single stream of video frames.

Example 8 may include the apparatus of Example 7, wherein the logic is further to process each sequential frame in the single stream of video frames as originated from a different one of the two or more video sources.

Example 9 may include the apparatus of Example 7, wherein the logic is further to determine a frame position of the prior frame based on a frame position of the current frame minus the number of video sources represented in the single stream of video frames.

Example 10 may include the apparatus of Example 9, wherein the logic is further to determine a video source position of a frame based on a frame position of the frame modulo the number of video sources represented in the single stream of video frames.

Example 11 may include the apparatus of any of Examples 7 to 10, wherein the logic is further to encode the single stream of video frames.

Example 12 may include the apparatus of any of Examples 7 to 10, wherein the logic is further to decode the single stream of video frames.

Example 13 may include a method of processing a video stream, comprising processing a single stream of video frames which includes frame information from two or more video sources, and processing a current frame based on information from a prior frame in the single stream of video frames which precedes the current frame by a number of frames based on a number of video sources represented in the single stream of video frames.

Example 14 may include the method of Example 13, further comprising processing each sequential frame in the single stream of video frames as originated from a different one of the two or more video sources.

Example 15 may include the method of Example 13, further comprising determining a frame position of the prior frame based on a frame position of the current frame minus the number of video sources represented in the single stream of video frames.

Example 16 may include the method of Example 15, further comprising determining a video source position of a frame based on a frame position of the frame modulo the number of video sources represented in the single stream of video frames.

Example 17 may include the method of any of Examples 13 to 16, further comprising encoding the single stream of video frames.

Example 18 may include the method of any of Examples 13 to 16, further comprising decoding the single stream of video frames.

Example 19 may include at least one computer readable medium, comprising a set of instructions, which when executed by a computing device, cause the computing device to process a single stream of video frames which includes frame information from two or more video sources, and process a current frame based on information from a prior frame in the single stream of video frames which precedes the current frame by a number of frames based on a number of video sources represented in the single stream of video frames.

Example 20 may include the at least one computer readable medium of Example 19, comprising a further set of instructions, which when executed by the computing device, cause the computing device to process each sequential frame in the single stream of video frames as originated from a different one of the two or more video sources.

Example 21 may include the at least one computer readable medium of Example 19, comprising a further set of instructions, which when executed by the computing device, cause the computing device to determine a frame position of the prior frame based on a frame position of the current frame minus the number of video sources represented in the single stream of video frames.

Example 22 may include the at least one computer readable medium of Example 21, comprising a further set of instructions, which when executed by the computing device, cause the computing device to determine a video source position of a frame based on a frame position of the frame modulo the number of video sources represented in the single stream of video frames.

Example 23 may include the at least one computer readable medium of any of Examples 19 to 22, comprising a further set of instructions, which when executed by the computing device, cause the computing device to encode the single stream of video frames.

Example 24 may include the at least one computer readable medium of any of Examples 19 to 22, comprising a further set of instructions, which when executed by the computing device, cause the computing device to decode the single stream of video frames.

Example 25 may include a video codec apparatus, comprising means for processing a single stream of video frames which includes frame information from two or more video sources, and means for processing a current frame based on information from a prior frame in the single stream of video frames which precedes the current frame by a number of frames based on a number of video sources represented in the single stream of video frames.

Example 26 may include the apparatus of Example 25, further comprising means for processing each sequential frame in the single stream of video frames as originated from a different one of the two or more video sources.

Example 27 may include the apparatus of Example 26, further comprising means for determining a frame position of the prior frame based on a frame position of the current frame minus the number of video sources represented in the single stream of video frames.

Example 28 may include the apparatus of Example 27, further comprising means for determining a video source position of a frame based on a frame position of the frame modulo the number of video sources represented in the single stream of video frames.

Example 29 may include the apparatus of any of Examples 25 to 28, further comprising means for encoding the single stream of video frames.

Example 30 may include the apparatus of any of Examples 25 to 28, further comprising means for decoding the single stream of video frames.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
memory communicatively coupled to the processor; and
logic communicatively coupled to the processor to:
process a single stream of video frames which includes frame information from two or more video sources, and
process a current frame based on information from a prior frame in the single stream of video frames which precedes the current frame by a number of frames based on a number of video sources represented in the single stream of video frames.

2. The system of claim 1, wherein the logic is further to:
process each sequential frame in the single stream of video frames as originated from a different one of the two or more video sources.

3. The system of claim 1, wherein the logic is further to:
determine a frame position of the prior frame based on a frame position of the current frame minus the number of video sources represented in the single stream of video frames.

4. The system of claim 1, wherein the logic is further to:
determine a video source position of a frame based on a frame position of the frame modulo the number of video sources represented in the single stream of video frames.

5. The system of claim 1, wherein the logic is further to:
encode the single stream of video frames.

6. The system of claim 1, wherein the logic is further to:
decode the single stream of video frames.

7. A semiconductor package apparatus, comprising:
a substrate; and
logic coupled to the substrate, wherein the logic is at least partly implemented in one or more of configurable logic and fixed-functionality hardware logic, the logic coupled to the substrate to:
process a single stream of video frames which includes frame information from two or more video sources, and
process a current frame based on information from a prior frame in the single stream of video frames which precedes the current frame by a number of frames based on a number of video sources represented in the single stream of video frames.

8. The apparatus of claim 7, wherein the logic is further to:
process each sequential frame in the single stream of video frames as originated from a different one of the two or more video sources.

9. The apparatus of claim 7, wherein the logic is further to:
determine a frame position of the prior frame based on a frame position of the current frame minus the number of video sources represented in the single stream of video frames.

10. The apparatus of claim 7, wherein the logic is further to:
determine a video source position of a frame based on a frame position of the frame modulo the number of video sources represented in the single stream of video frames.

11. The apparatus of claim 7, wherein the logic is further to:
encode the single stream of video frames.

12. The apparatus of claim 7, wherein the logic is further to:
decode the single stream of video frames.

13. A method of processing a video stream, comprising:
processing a single stream of video frames which includes frame information from two or more video sources; and
processing a current frame based on information from a prior frame in the single stream of video frames which precedes the current frame by a number of frames based on a number of video sources represented in the single stream of video frames.

14. The method of claim 13, further comprising:
processing each sequential frame in the single stream of video frames as originated from a different one of the two or more video sources.

15. The method of claim 13, further comprising:
determining a frame position of the prior frame based on a frame position of the current frame minus the number of video sources represented in the single stream of video frames.

16. The method of claim 13, further comprising:
determining a video source position of a frame based on a frame position of the frame modulo the number of video sources represented in the single stream of video frames.

17. The method of claim 13, further comprising:
encoding the single stream of video frames.

18. The method of claim 13, further comprising:
decoding the single stream of video frames.

19. At least one non-transitory computer readable medium, comprising a set of instructions, which when executed by a computing device, cause the computing device to:
process a single stream of video frames which includes frame information from two or more video sources; and
process a current frame based on information from a prior frame in the single stream of video frames which precedes the current frame by a number of frames based on a number of video sources represented in the single stream of video frames.

20. The at least one non-transitory computer readable medium of claim 19, comprising a further set of instructions, which when executed by the computing device, cause the computing device to:
process each sequential frame in the single stream of video frames as originated from a different one of the two or more video sources.

21. The at least one non-transitory computer readable medium of claim 19, comprising a further set of instructions, which when executed by the computing device, cause the computing device to:
determine a frame position of the prior frame based on a frame position of the current frame minus the number of video sources represented in the single stream of video frames.

22. The at least one non-transitory computer readable medium of claim 21, comprising a further set of instructions, which when executed by the computing device, cause the computing device to:
determine a video source position of a frame based on a frame position of the frame modulo the number of video sources represented in the single stream of video frames.

23. The at least one non-transitory computer readable medium of claim 19, comprising a further set of instructions, which when executed by the computing device, cause the computing device to:
encode the single stream of video frames.

24. The at least one non-transitory computer readable medium of claim 19, comprising a further set of instructions, which when executed by the computing device, cause the computing device to:
decode the single stream of video frames.

* * * * *